July 16, 1940.  E. L. TORNQUIST  2,207,840
METERING SYSTEM
Filed July 15, 1938  4 Sheets-Sheet 1
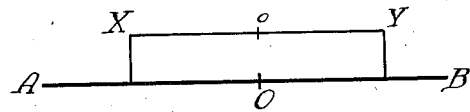
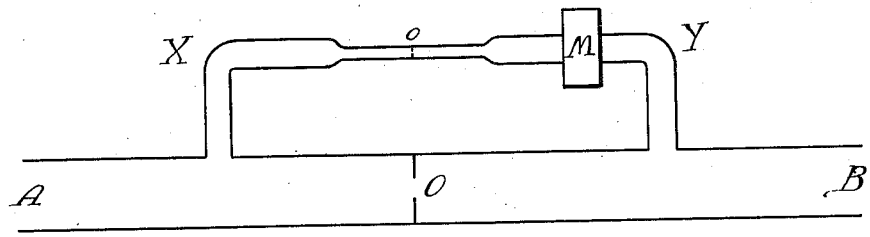
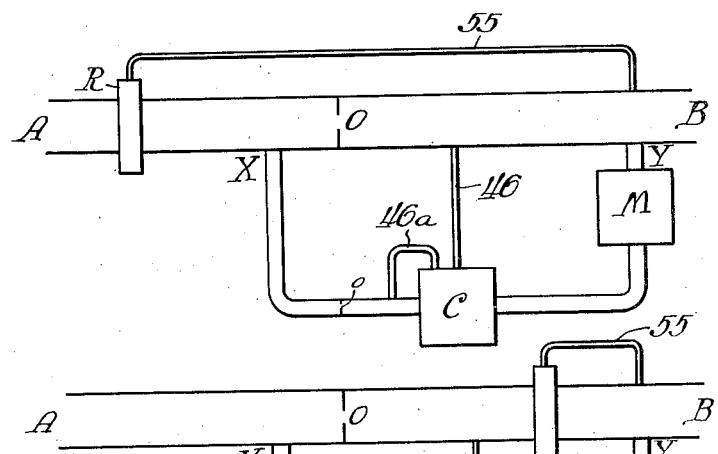
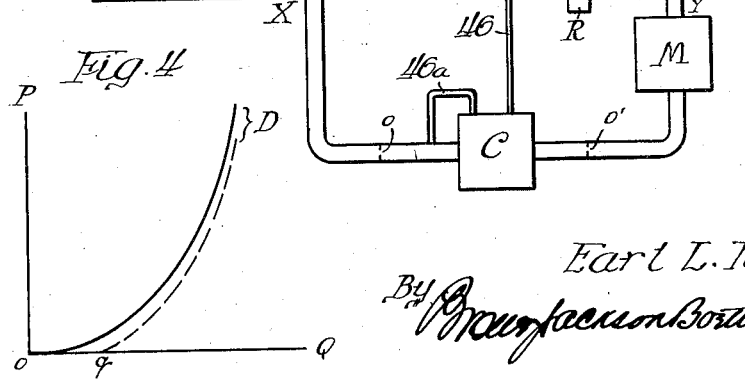
Inventor:
Earl L. Tornquist.

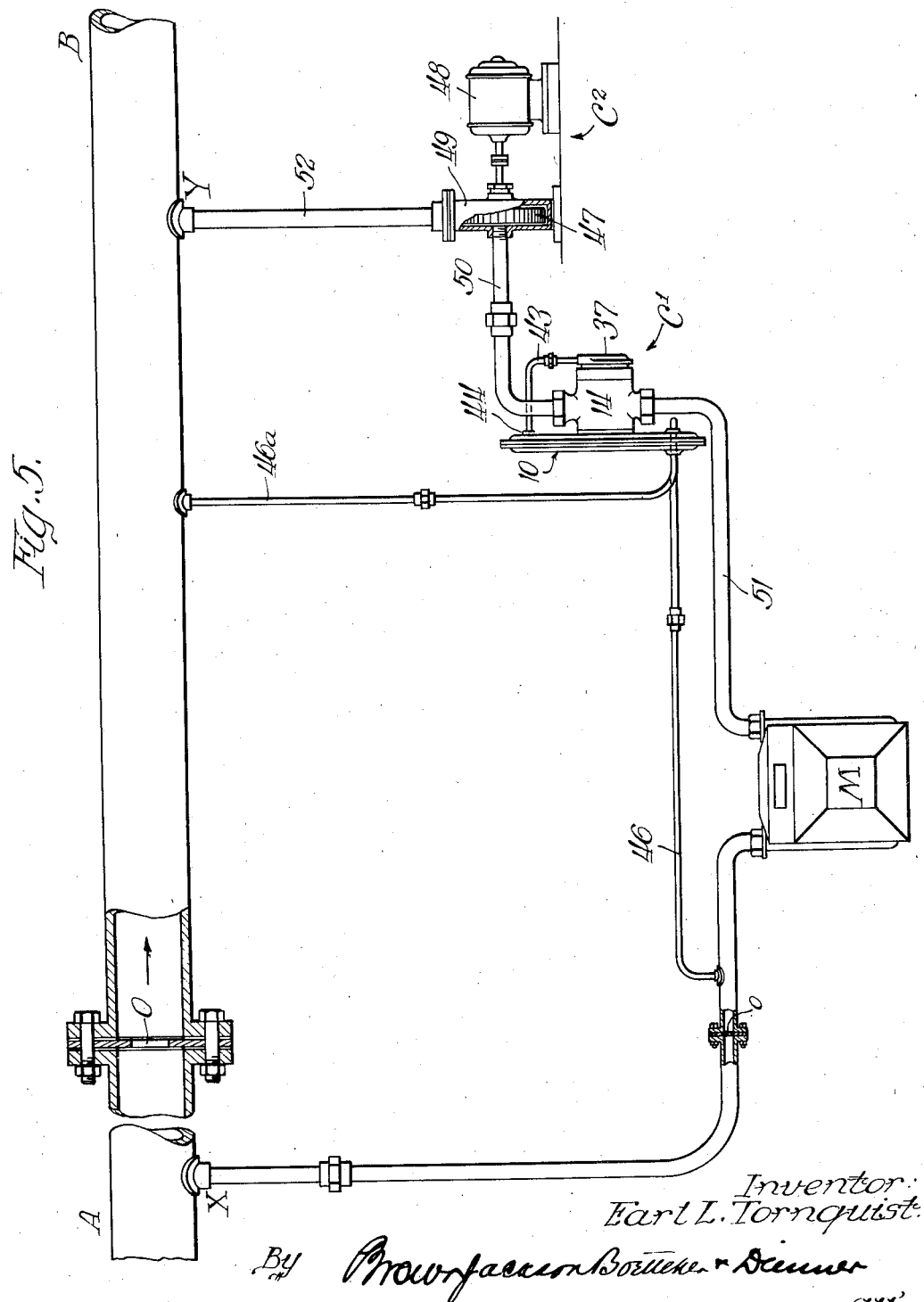

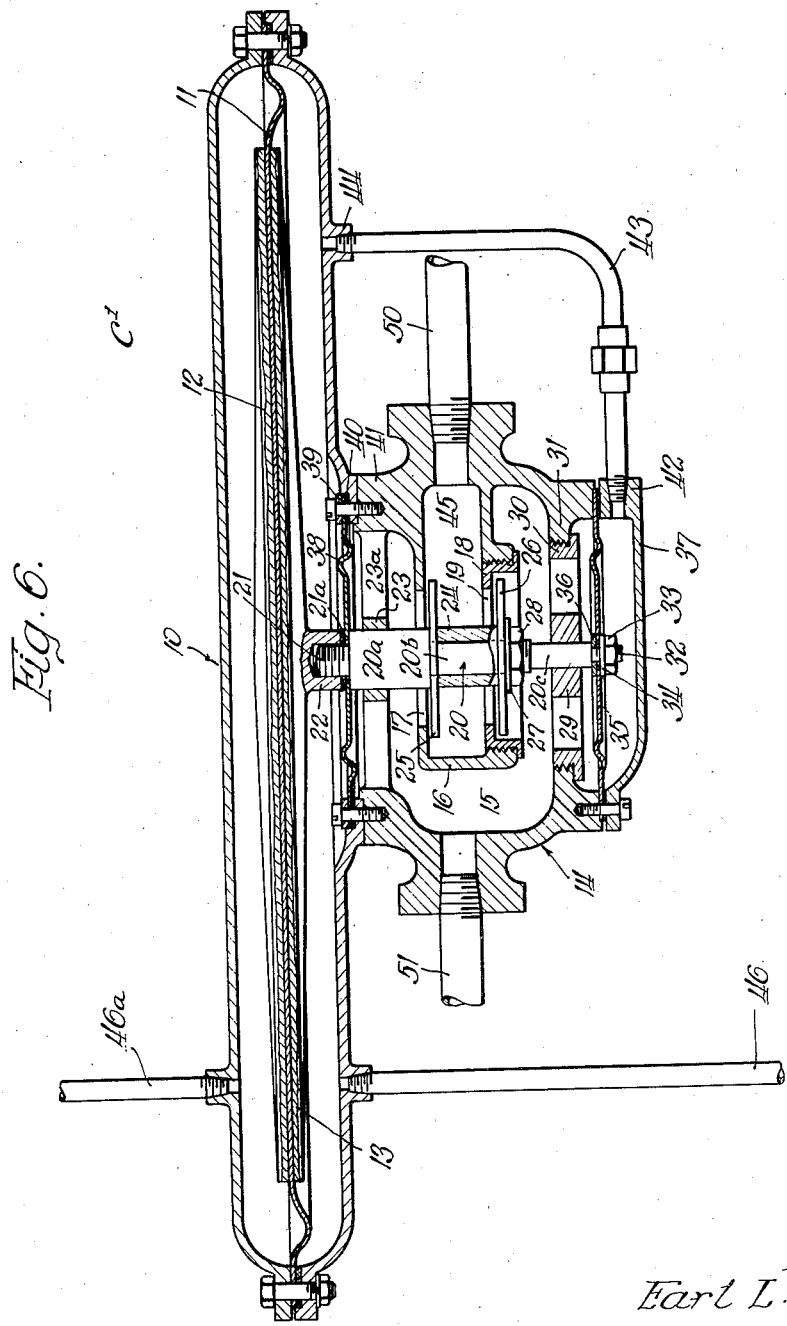

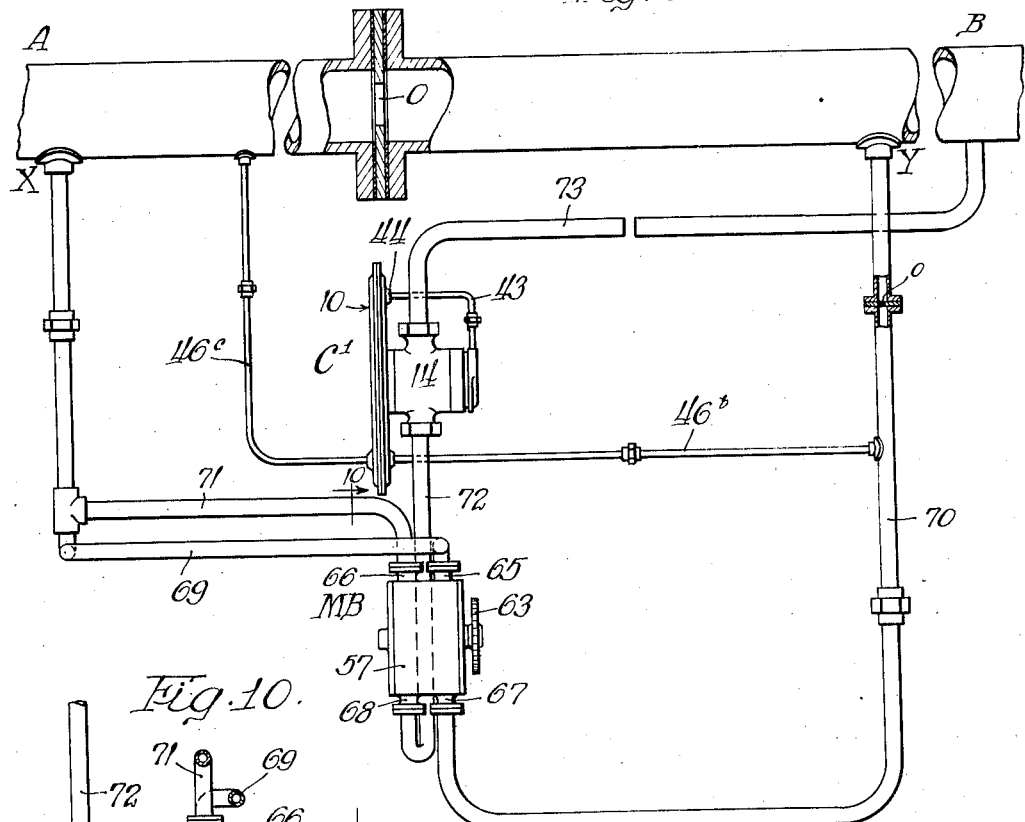

Patented July 16, 1940

2,207,840

UNITED STATES PATENT OFFICE 2,207,840

METERING SYSTEM

Earl L. Tornquist, Elmhurst, Ill.

Application July 15, 1938, Serial No. 219,435

8 Claims. (Cl. 73—203)

This invention relates to metering means, and has to do with means for metering large quantities of fluids.

My invention is directed to a metering means or system capable of accurately measuring, by means of a positive displacement or volume meter or other suitable means, large volume gas or fluid flow. More specifically, I cause gas to flow through two paths having a definite ratio with respect to flow volume, the flow volume in one path being relatively large, measure the gas flowing through the path of lesser flow volume by means of a suitable meter, and compensate for the meter friction in a manner effective for maintaining the predetermined flow volume ratio while avoiding objectionable interference with gas flow through either path. Further objects and advantages of my invention will appear from the detail description.

In the drawings:

Figure 1 is a diagrammatic view illustrating the usual method of metering small quantities of gas;

Figure 2 is a diagrammatic view illustrating the use of a main conduit and a shunt conduit, each having a metering orifice, for causing the gas to flow through two paths having a predetermined flow volume ratio;

Figure 3 is a diagrammatic view on the order of Figure 2, but with a meter in the shunt circuit;

Figure 4 is a graph illustrating the pressure drop across the metering orifices without the meter in the shunt conduit and with a meter in the shunt conduit;

Figure 5 is a semi-diagrammatic view, partly broken away and in section, of a metering system embodying my invention;

Figure 6 is a transverse vertical sectional view through the control valve in the shunt conduit and the operating means therefor and associated parts, certain parts being shown in elevation and certain other parts being shown partly broken away and in section;

Figure 7 is a diagrammatic view of a modified form of metering system embodying my invention;

Figure 8 is diagrammatic view of a second modified form of metering system embodying my invention;

Figure 9 is a semi-diagrammatic view of a third modified form of metering system embodying my invention;

Figure 10 is a side view of the meter and associated parts used in Figure 9, taken substantially on line 10—10 of the latter figure;

Figure 11 is a sectional view taken substantially on line 11—11 of Figure 10; and Figure 12 is a sectional view taken substantially on line 12—12 of Figure 11.

When it is desired to meter small quantities of gas, it is possible to insert directly into the line some form of positive displacement meter, such as a diaphragm meter or wet type meter. That arrangement is shown diagrammatically in Fig. 1, in which the gas flow is considered as being from left to right in the pipe A—B and a meter M is inserted directly in the pipe line.

In the case of large quantities of gas flow the arrangement of Figure 1 could be used, provided it was practicable to use a volume meter as in Figure 1, but ordinarily it is not practicable to use a meter of the positive displacement or volume type under such conditions. One type of meter which is used for measuring large volume gas flow is the Connersville meter, which contains rotating impellers of substantially figure eight shape. For mechanical reasons, the positions of the impellers are controlled by positioning gears, so that a small open clearance always exists between the impellers themselves and between the impellers and the enclosing case. In operation, there is a small pressure drop across the meter to supply friction losses and this, and other dynamic and static heads produced inside of the meter, causes a certain amount of gas to slip through the meter by means of the clearance spaces. A slip correction or calibration curve may be measured at the factory and furnished to the user of the meter, but changes in clearances, caused by wear in service, film deposit in the meter, and other related factors render such corrections uncertain and unreliable for precision work. A further objection to this type of meter is its large bulk and heavy cost of installation. A meter of the Connersville type may, however, be used to advantage in the system of my invention, since it may be small and objectionable slippage losses avoided, as will hereinafter appear.

Other types of meters, such as the Venturi or orifice type, may be used in the place of meter M of Figure 1, for metering large volume gas flow. These types of meters are subject to at least three serious objections. First, the pressure drop available for measuring purposes is a second power function of the gas flow, making accurate registration difficult or impossible at part capacity loadings which, though small, are still a considerable fraction, such as from one-third to onefourth of full load. Secondly, the accuracy of such meters is adversely affected by certain types of pressure fluctuations and pressure changes in the line. Thirdly, such meters are influenced by such factors as specific gravity, expansion of the gas and the Reynolds number. Further, they are not integrating and recording.

A further type of meter used for direct metering of large volume gas flow is the Thomas meter, utilizing a thermal principle. In this meter, electrical current is supplied to a heating coil placed in the main gas stream and temperatures are recorded by additional coils placed upstream and downstream from the heating coil. These coils are connected to a relay in such a manner that the temperature rise caused by the heating coil is held constant at approximately 2° F. Any departure from this temperature rise operates relays in such a manner as to increase or decrease the current in the heating coil. Assuming a constant specific heat for the gas, the wattage input into the heating coil is directly proportional to the gas flow and can be measured and recorded by a simple watt meter calibrated in terms of gas flow. This principle, while simple and direct in theory, has met with only indifferent success and adoption. There are several reasons for that. In the production of gas as a commercial proposition, it is necessary to change the component gases making up the total gas mixture. In doing so, necessary compromises are resorted to in maintaining within practical limits the B. t. u., specific gravity and flame propagation characteristics of the gas. To demand that the specific heat also be maintained constant for various mixtures, within an accuracy of one-half of one per cent or better, would impose another serious limitation on the manufacture and mixture of the gas. Further, as a practical matter, gas frequently carries impurities which attack the heating and temperature coils. In order to maintain the physical integrity and precise electrical characteristics of the electrical coils, they must be enclosed in protective sheaths which introduce considerable thermal lag and, hence, inaccuracy into the operation of the meter.

From the above brief review of present metering practice it will be seen that, while meters are available for measuring small quantities of gas flow with high accuracy and practical operating convenience, the measuring of large quantities of gas flow with accuracy involves certain difficulties which, from a practical standpoint, cannot be avoided if the entire gas flow is directly measured. My invention is directed particularly to the provision of simple and efficient means whereby large volume gas flow may be measured with greater accuracy than is possible under present practice.

In Figure 2 I have shown a shunt conduit X—Y connected to the main conduit A—B, this shunt conduit receiving a relatively small portion of the gas to be measured, the main volume of the gas flowing through the main conduit. If the ratio of the volume of gas flowing through the shunt conduit to the volume of gas flowing through the main conduit is precisely controlled and known, and the quantity of gas flowing through the shunt conduit is accurately measured without upsetting the precise flow volume ratio between the two gas streams, the total volume of gas flowing through both the main conduit and the shunt conduit can be determined with expedition and facility, thus solving the problem.

The first step in the solution is illustrated in Figure 2. An orifice O is inserted in the main conduit A—B, between the upstream connection and the downstream connection of the shunt conduit to the main conduit, and a much smaller orifice o is inserted in the shunt conduit. The orifices are similar and suitable lengths of straight pipe are provided ahead of and behind each of the orifices. Without any meter in the shunt conduit, a strictly accurate and determinate division of gas flow between the main and the shunt paths may be obtained. This accurate division is not upset by changing gas pressures nor pulsating gas flow since, for two similar orifices, both are affected in an identical manner and the accurate division of the gas is not disturbed. The problem then resolves itself into the insertion in the shunt conduit of a gas meter M, shown in Figure 3, which will measure accurately the flow of gas in the shunt conduit, without upsetting the accurate division of the gas flow between the main conduit and the shunt conduit. The question of accuracy is easily met by using one of the accepted types of positive displacement meters now commonly used for measuring small gas flows, such as the diaphragm or wet type meter. But, by inserting such a meter in the shunt conduit, a small but changing and unpredictable pressure drop or friction has been added to the shunt conduit, upsetting the accurate division of the gas flow between the main conduit and the shunt conduit. This is shown in Figure 4, in which P indicates the pressure drop across either one or both of the orifices of Figure 3, with no meter in the shunt conduit. The full line curve indicates the pressure drop referred to and is a parabola or second power function of the gas flow Q. If it be assumed that the meter M of Figure 3 is a diaphragm type of meter, stiffness of the bellows, friction of the slide valves, gear train, etc., will cause a small pressure drop D, so that the pressure drop across the smaller orifice o becomes some such curve as the dotted line curve in Figure 4. This latter curve crosses the zero pressure line at a point q considerably above zero pressure. At any smaller rate of gas flow and pressure, the meter will not register at all. In general, the same applies to any other type of meter placed in the shunt conduit. In order to assure accuracy, particularly at partial load and low rates of gas flow, the pressure drop across the orifice o in the shunt conduit should be the same as that across the orifice O in the main conduit, and the curve indicating the pressure drop across the shunt orifice should coincide with the curve indicating the pressure drop across the main orifice. That result may be accomplished by compensating for the friction or resistance to flow of gas through the shunt conduit offered by the meter.

Referring to Figure 5, main conduit A—B is provided with a plate orifice O and shunt conduit X—Y is connected to the main conduit at the upstream side of the downstream side of orifice O, the shunt conduit being provided with a relatively small orifice o. In both the main conduit and the shunt conduit the pipe should be straight at each side of the orifice for a length equal to from fifteen to twenty times the interior diameter of the pipe, to avoid any disturbance in the gas flow which might be caused by bends or elbows in the pipe and might have a tendency to interfere with the accuracy in operation of the metering orifices. A gas meter M, preferably of the positive displacement or volume type, such as a Glover two-diaphragm slide valve meter, is connected directly in the shunt conduit at the downstream side of the orifice o.

I provide in the shunt conduit means effective for compensating for the friction of meter M, such means including a control valve and operating means therefor, together constituting a unit C1, and a booster designated C2. The control means, comprising the unit C1 and the booster C2, may be disposed in any suitable manner for attaining the desired results, but preferably is disposed as shown in Figure 5.

In Figure 6 the unit C1 is shown in section to illustrate the interior arrangement thereof. This unit comprises a diaphragm housing 10 within which is mounted, in an appropriate manner, a diaphragm 11 having plates 12 and 13 at its opposite sides. A valve housing 14 is appropriately secured to and depends from housing 10 and defines a gas inlet passage 15 extending about an outlet member 16, formed integrally with housing 14. Member 16 is provided, in its top wall, with a port 17 and receives, in its bottom wall, a threaded collar 18 defining a port 19 of the same diameter as port 17. A valve stem 20 is secured, at its upper end, to plate 13, centrally thereof, by means of a reduced screw stud 21 threaded into a short neck 22 formed integrally with plate 13. Upper portion 20a of stem 20 is of increased diameter relative to stud 21, and is slidable through a guide collar 23 supported by radial arms 23a integral with housing 14. Intermediate portion 20b of valve stem 20 is of reduced diameter relative to portion 20a, and receives a spacing sleeve 24. An upper disc valve 25 fits about portion 20b of the valve stem and is clamped between the upper end of sleeve 24 and the lower end of upper portion 20a of the valve stem, at the underface of the top wall of member 16, and a lower disc valve 26 is clamped between the lower end of sleeve 24 and a washer 27 and a nut 28 screwed onto the lower end of intermediate portion 20b of the valve stem, at the under side of collar 18 adjacent port 19. The lower portion 20c of valve stem 20 is reduced in diameter relative to portion 20b, and is slidable through collar 29 of a ring spider 30 screwed into a flange 31 of housing 14. At its lower end stem 20 is provided with a reduced screw stud 32 receiving a nut 33 and washer 34, stud 32 passing centrally through a diaphragm 35 clamped, at its central portion, between washer 34 and a washer 36 fitting about stud 32 and contacting the lower end of portion 20c of stem 20. The circumferential portion of diaphragm 35 is clamped between housing 14 and a flanged cover 37 appropriately secured to the lower end of the housing. A diaphragm 38, of the same effective area as diaphragm 35, is clamped at its central portion between upper portion 20a of valve stem 20 and a washer 21a disposed about screw stud 21 at the lower end of neck 22. The circumferential portion of diaphragm 38 is clamped between rings 39 and 40 appropriately secured, as by screw means, to a flange 41 extending circumferentially of the upper end of valve housing 14. Cover 37 is provided with a lug 42, suitably bored and threaded for reception of one end of a tube 43 the other end of which is threaded into a boss 44 integral with the lower wall of housing 10, this boss having an opening therethrough into housing 10 at the lower side of diaphragm 11. It will be seen that the diaphragms 35 and 38 are subjected to the pressure within housing 10 beneath diaphragm 11 and act in opposition, and are also subjected, at their inner sides, to the pressure within passage 15, the valves 25 and 26 being subjected, at their outer faces, to the pressure within passage 15 and, at their inner faces, to the pressure within outlet passage 45 defined by member 16. Accordingly, the valve structure is balanced with respect to the opposing pressures referred to, and will move in accordance with differences in pressure applied to opposite sides of diaphragm 11.

The space within housing 10 at the lower side of diaphragm 11 is connected, by a tube 46, to the shunt conduit at a point downstream from the orifice o, the point of connection of tube 46 to the shunt conduit being spaced from the orifice o a distance equal to eight times the interior diameter of the pipe of the shunt conduit. The space within housing 10 above diaphragm 11 is connected, by a tube 46a, to the main conduit at the downstream side of the main orifice O, at a distance therefrom equal to eight times the interior diameter of the pipe of the main conduit. The unit C1 constitutes a regulator for controlling flow of gas through the shunt conduit responsive to tendency to differences in pressure at the downstream side of the main orifice O and the downstream side of the shunt orifice o, that is, to tendency to differences in pressure drop across the orifices.

The booster C2 comprises a centrifugal fan or blower 47 continuously driven by a fractional horsepower electric motor 48, which may be quite small. Blower 47 is mounted within an appropriate housing 49 the intake of which is connected by a pipe 50 to the outlet of valve housing 14, the inlet of which housing is connected by pipe 51 to the outlet of meter M, pipes 50 and 51 constituting elements of the shunt conduit X—Y. The outlet of the blower housing 49 is connected by pipe 52 to the main conduit A—B at a point an appropriate distance downstream from the point of connection of tube 46a to the main conduit. The unit C1 constitutes a regulator which, together with the booster C2, provides control means for compensating for the friction of meter M.

The pressure drop across the shunt orifice o tends at all times to be greater than the pressure drop across the main orifice O, due to the presence of the meter M in the shunt conduit. The blower 47 produces in the shunt conduit effective pressure in the direction of flow therethrough of the gas. The effectiveness of the booster is controlled by the balanced valve comprising the valve discs 25 and 26. If the pressure at the point of connection of tube 46 to the shunt conduit tends to become less than the pressure in the main conduit at the point of connection of tube 46a thereto, diaphragm 11 will move downward slightly, thus opening the valve to a greater extent and permitting the pressure produced by the booster to become increasingly effective for causing flow of gas through the shunt conduit, thus increasing the pressure at the downstream side of shunt orifice o to a value equal to the pressure at the downstream side of the main orifice O, at which time equilibrium in the pressures at the opposite sides of diaphragm 11 will be established and movement of the valve will cease. On the other hand, if the pressure at the downstream side of the shunt orifice o tends to become greater than the pressure at the downstream side of the main orifice O, due to the effect of the booster, diaphragm 11 will be moved in a direction tending to close the valve, due to the greater pressure obtaining at the under side of the diaphragm, thus rendering the booster less effective for causing flow of gas through the shunt orifice o, this closing movement of the down-valve continuing until the pressure at the downstream side of the shunt orifice has been reduced to a value equal to the pressure at the downstream side of the main orifice O, at which time the valve will become stabilized. The regulator C1 and the booster C2 thus cooperate to assure that the pressure drop across the shunt orifice o is maintained equal to the pressure drop across the main orifice O. That assures that the predetermined ratio of gas flow volume through the two orifices is maintained, so that the volume of gas flowing through the shunt orifice will provide an accurate measure of the total volume of gas flow. Under such conditions, by multiplying the reading of meter M by a suitable factor, the total gas flow through both the main orifice and the shunt orifice may be readily and accurately determined.

In Figure 5 I have shown the regulator or control unit C1 and the booster C2 as separate units disposed at different positions in the shunt conduit. In practice, these two units may be disposed within a common casing or housing, thus providing a control unit. It is also desirable, in certain cases, to reduce the pressure in the main conduit and in the shunt conduit, as where it is desired to take gas from the main conduit for domestic use. In Figure 7 the main conduit A—B is provided with a metering orifice O, the shunt conduit X—Y is connected to the main conduit at a point upstream and a point downstream from orifice O, as before, and is provided with a metering orifice, o, a control unit C and a meter M. The control unit C comprises the units C1 and C2 of Figure 5 and, it will be noted, is disposed upstream from the meter M, instead of being downstream therefrom as in Figure 5. A pressure regulator and reducer R is disposed in the main conduit A—B upstream from the point of connection of the shunt conduit to the main conduit, at the upstream side of the main orifice O, this regulator also being connected by a tube 55 to the main conduit at the point of connection thereto of the shunt conduit at the downstream side of orifice O. The pressure reducer and regulator R may be of any suitable known type and need not be illustrated nor described in greater detail. Suffice it to say that the unit R is effective for reducing the pressure within the main conduit, at the downstream side of such unit, and consequently within the shunt conduit also, to a desired predetermined value. For example, if the pressure within the main conduit at the upstream side of the unit R is 100 lbs., this unit may reduce the pressure at the downstream side thereof and at the upstream side of the respective orifices, to 5.5 lbs., the pressure at the downstream side of the respective orifices being 5 lbs., if it be assumed that the pressure drop across the orifices is .5 lb. each.

The control unit C functions in the manner previously described to maintain the pressure drop across the shunt orifice o equal to the pressure drop across the main orifice O. Since the pressure at the upstream side of the respective orifices is maintained at a constant value, thus eliminating fluctuations in pressure, any tendency to inaccuracy due to inertia of moving parts of the meter, such as might arise in the case of exceptionally great fluctuations in pressure, is eliminated, which is conducive to precision in metering. The arrangement of Figure 7 has the further advantage, previously noted, of reducing the gas pressure in the main conduit, at the downstream side thereof beyond the reducing and regulating unit R, to such a value that the gas may be taken directly from the main line for domestic or other uses.

In Figure 8 I have shown a pressure reducer and regulator R in the main conduit A—B, between the connection thereto of tube 46 and the downstream connection of the shunt conduit X—Y. It may be assumed, for purposes of explanation, that the gas pressure within the main conduit, and the shunt conduit, at the upstream side of the respective orifices, is 101 lbs., that the pressure drop across each orifice is 1 lb., so that the pressure in the main conduit between orifice O and unit R is 100 lbs. and the pressure in the shunt conduit between orifice o and the control unit C is 100 lbs., the pressure within the main conduit at the downstream side of unit R being 5 lbs. Under such conditions the booster may be omitted, the control unit C then corresponding to the unit C1 of Figure 5. Since the pressure in the shunt conduit, between orifice o and control unit C is 100 lbs., and the pressure in the main conduit at the downstream side of unit R is 5 lbs., the pressure in the shunt line between control unit C and meter M need be only 5 lbs., plus the pressure required to compensate for the friction of meter M, in order to maintain the pressure drop across the shunt orifice o equal to the pressure drop across the main orifice O. Ample pressure is available for that purpose at the upstream side of control unit C, rendering the use of a booster unnecessary. If desired, a pressure regulating device, such as an orifice o1 may be inserted in the shunt conduit X—Y, at the downstream side of control unit C, this latter orifice cooperating with the unit C for maintaining the pressure in the shunt conduit, between orifice o1 and meter M at the same value as the pressure within the main conduit at the downstream side of unit R, plus the pressure required to compensate for the meter friction.

The modified system illustrated in Figures 9 to 12, inclusive, includes a combined booster and meter of the Connersville type, constituting a unit MB. This unit comprises a casing 57 divided interiorly, by a partition 58, into two separate compartments 59 and 60, the former being the meter compartment and the latter the booster compartment. Two impellers 61 are mounted for rotation within compartment 59, by means of shafts 62 rotatably mounted in the side walls and partition 58 of casing 57, on which shafts impellers 61 are suitably secured. Shafts 62 project outward beyond one side wall of casing 57 and have secured thereon intermeshing gears 63 effective for maintaining the proper angular relation between impellers 61. Two impellers 64, similar to impellers 61, are secured upon shafts 62, within compartment 60. The unit MB is in essential respects similar to a Connersville meter, operates in a known manner and requires no further detailed description. The showing of this unit is more or less diagrammatic, and it will be understood that the meter side thereof is provided with appropriate dials and recording mechanism, the two compartments of casing 57 are sealed gas tight with respect to each other, and appropriate seals may be provided about impeller shafts 62 where they pass through partition 58 and the side walls of the casing.

Casing 57 of unit MB is provided, at its top, with two inlet fittings 65 and 66 opening into compartments 59 and 60, respectively, centrally thereof. At its bottom, casing 57 is provided with two outlet fittings 67 and 68 respectively opening centrally into compartments 59 and 60. Fittings 65 and 67 are respectively connected to pipes 69 and 70 constituting elements of the shunt conduit X—Y, the latter pipe being provided with the relatively small orifice o and connected to the main conduit A—B at the downstream side of the relatively large orifice O. Regulator C¹ is connected by pipes 46b and 46c to pipe 70 and main conduit A—B, respectively, at the upstream side of orifice o and orifice O, an appropriate distance from each orifice. Inlet fitting 66 is connected by a pipe 71 to shunt conduit X—Y, at the upstream side of unit MB, and outlet fitting 68 is connected by a pipe 72 to the inlet of valve housing 14, from the outlet of which may extend an exhaust pipe 73. The latter pipe may exhaust to atmosphere, as shown in full lines, or it may be connected to the main conduit A—B, as indicated, at an appropriate point thereof downstream from orifice o, and at which the pressure in the main conduit is relatively low, particularly if the pressure within conduit A—B is reduced at the downstream side of orifice O as in Figure 8.

In the system of Figure 9, the points of connection of pipes 46b and 46c to pipe 70 and main conduit A—B, respectively, are so related to orifices o and O that the pressure drop across them is equal and the desired flow ratio through these orifices is maintained, so long as the pressures at such points are kept equal one to the other. Under such conditions, a certain amount of gas flows through the booster side of unit MB, driving the meter to an extent effective to compensate for meter friction, the regulator C¹ being properly adjusted to that end. If the pressure within pipe 70, at the point of connection thereto of pipe 46b, tends to fall below the pressure within conduct A—B, at the point of connection of pipe 46c thereto, regulator C¹ is actuated so as to permit increased flow of gas through the booster compartment 60 of the unit MB. The meter is then driven at increased speed for forcing the gas through pipe 70, the booster effect produced serving to restore the pressure within pipe 70, at its juncture with pipe 46b, to the same value as the pressure within main conduit A—B, at its juncture with pipe 46c; after which the meter continues in operation, with compensation for meter friction, as before. The speed of the booster is thus regulated automatically, to suit requirements. In that manner meter friction is compensated, objectionable gas slippage through the meter is eliminated, the desired predetermined flow ratio through the orifices is maintained and accuracy is assured.

It will be noted that in Figure 9, the unit MB is at the upstream side of the shunt orifice o, and the connections of pipes 46b and 46c to pipe 70 and main conduit A—B, respectively, are at the upstream side of shunt orifice o and main orifice O. The system of my invention contemplates disposing the booster and/or meter at either the upstream or the downstream side of the shunt orifice o, with the regulator connections at either the upstream or the downstream side of the respective orifices; as will be understood from the above.

While I have described the system of my invention as being permanently connected for measuring large flows of gas or fluids, it is also well adapted for checking large meters in place. The apparatus of the system is relatively simple and light, and may readily be transported and installed. In testing a large meter in place, the system of my invention may be connected as shown, with the large meter to be tested connected to the main conduit A—B, and the readings of the large meter checked against the readings of my measuring system. If desired, for greater precision, a known volume of fluid, at a known pressure and temperature, may be caused to flow through the system of my invention and the meter to be tested, in a manner understood in the art. It will be clear to those skilled in the art, from what has been said, that this system may be used to advantage for testing large meters in place and further detailed description of such use is not thought necessary.

As above indicated, variations in my invention may be resorted to without departing from the field and scope thereof, and I intend to include in this application, in which the preferred forms only of my invention have been disclosed, all such variations as fall within the scope of the appended claims.

I claim:

1. In metering means, a main conduit for gas flow provided with a metering orifice, a shunt conduit connected to said main conduit at the upstream side and the downstream side of said orifice and provided with a metering orifice, a volume meter in said shunt conduit, a booster connected to said shunt conduit effective for creating therein pressure in the direction of gas flow therethrough, and valve means controlling gas flow through said shunt conduit responsive to tendency to difference between the pressure drop across said main orifice and the pressure drop across said shunt orifice effective for maintaining the pressure drop across the respective orifices equal.

2. In metering means, a main conduit for gas flow provided with a metering orifice, a shunt conduit connected to said main conduit at the upstream side and the downstream side of said orifice and provided with a metering orifice, a volume meter in said shunt conduit, a booster connected to said shunt conduit effective for creating therein pressure in the direction of gas flow therethrough, a balanced valve controlling gas flow through said shunt conduit, and a diaphragm operatively connected to said valve subject at its opposite sides to the gas pressure within said main conduit and said shunt conduit, respectively, at the downstream sides of the respective orifices.

3. In metering means, a main conduit for gas flow provided with a metering orifice, a shunt conduit connected to said main conduit at the upstream side and the downstream side of said orifice and provided with a metering orifice, a volume meter in said shunt conduit, a booster in said shunt conduit at the downstream side of said meter effective for creating in said shunt conduit pressure in the direction of gas flow therethrough, and valve means between said meter and said booster controlling gas flow through said shunt conduit responsive to tendency to difference between the pressure drop across said main orifice and the pressure drop across said shunt orifice effective for maintaining the pressure drop across the respective orifices equal.

4. In metering means, a main conduit for gas flow provided with a metering orifice, a shunt conduit connected to said main conduit at the upstream side and the downstream side of said orifice and provided with a metering orifice, a volume meter in said shunt conduit, a booster in said shunt conduit at the downstream side of said meter effective for creating in said shunt conduit pressure in the direction of gas flow therethrough, a balanced valve in said shunt conduit between said meter and said booster controlling gas flow through said shunt conduit, and a diaphragm operatively connected to said valve subject at its opposite sides to the gas pressure within said main conduit and said shunt conduit, respectively, at the downstream side of the respective orifices.

5. In metering means, a main conduit for fluid flow provided with a metering orifice, a shunt conduit connected to said main conduit at the upstream side and the downstream side of said orifice and provided with a metering orifice, a meter in said shunt conduit, means for driving said meter, and means regulating said driving means responsive to tendency to difference between the pressure drop across said main orifice and the pressure drop across said shunt orifice whereby the pressure drop across said orifices is maintained equal.

6. In metering means, a main conduit for fluid flow provided with a metering orifice, a shunt conduit connected to said main conduit at the upstream and the downstream sides of said orifice and provided with a metering orifice, an impeller meter in said shunt conduit, impeller drive means for driving said meter, means for admitting fluid under pressure from said main conduit to said drive means for driving the latter, and means for regulating the fluid flow through said drive means responsive to tendency to difference between the pressure drop across said main orifice and the pressure drop across said shunt orifice whereby the pressure drop across said orifices is maintained equal.

7. In metering means, a main conduit for fluid flow provided with a metering orifice, a shunt conduit connected to said main conduit at the upstream and the downstream sides of said orifice and provided with a metering orifice, an impeller meter in said shunt conduit at the upstream side of said shunt orifice, impeller drive means driven by fluid under pressure and having driving connection to said meter, and means responsive to tendencies to differences between the pressure in said shunt conduit at the upstream side of said shunt orifice and the pressure in said main conduit at the upstream side of said main orifice for regulating the fluid flow through said drive means whereby the pressure at the upstream sides of said orifices is maintained equal.

8. In metering mean, a main conduit for fluid flow provided with a metering orifice, a shunt conduit connected to said main conduit at the upstream side and the downstream side of said orifice and provided with a metering orifice, a meter in said shunt conduit, a booster associated with said meter for creating effective pressure in said shunt conduit in the direction of fluid flow therethrough sufficient to compensate for the resistance to fluid flow offered by said meter, a balanced valve controlling the effectiveness of said booster, and a diaphragm operatively connected to said valve subject at its opposite sides to the fluid pressure within said main conduit and said shunt conduit, respectively, at corresponding sides of the respective orifices.

EARL L. TORNQUIST.